(12) United States Patent
Frontiero et al.

(10) Patent No.: US 8,762,944 B2
(45) Date of Patent: Jun. 24, 2014

(54) BUILD PROCESS MANAGEMENT SYSTEM

(75) Inventors: William H. Frontiero, Gloucester, MA (US); Sherard J. Howe, San Antonio, TX (US); Spencer T. Murata, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/069,915

(22) Filed: Mar. 23, 2011

(65) Prior Publication Data

US 2012/0246616 A1 Sep. 27, 2012

(51) Int. Cl.
*G06F 9/44* (2006.01)

(52) U.S. Cl.
USPC .......................................... 717/121; 717/120

(58) Field of Classification Search
None
See application file for complete search history.

(56) References Cited

U.S. PATENT DOCUMENTS

| | | | |
|---|---|---|---|
| 5,574,898 A | 11/1996 | Leblang et al. | |
| 7,694,291 B2 | 4/2010 | Chen et al. | |
| 7,761,851 B2* | 7/2010 | Bailey et al. | 717/121 |
| 8,037,453 B1* | 10/2011 | Zawadzki | 717/123 |
| 8,225,281 B1* | 7/2012 | Hardinger et al. | 717/120 |
| 8,245,192 B1* | 8/2012 | Chen et al. | 717/122 |
| 2004/0261055 A1* | 12/2004 | Bertelrud et al. | 717/106 |
| 2005/0044533 A1* | 2/2005 | Nesbit et al. | 717/124 |
| 2006/0212857 A1* | 9/2006 | Neumann et al. | 717/140 |
| 2007/0245323 A1* | 10/2007 | Bertelrud | 717/140 |
| 2008/0033846 A1* | 2/2008 | Rehrauer et al. | 705/28 |
| 2008/0120598 A1* | 5/2008 | Imeshev | 717/120 |
| 2010/0050156 A1* | 2/2010 | Bonanno et al. | 717/122 |
| 2010/0153920 A1* | 6/2010 | Bonnet | 717/122 |
| 2011/0161929 A1* | 6/2011 | Keating | 717/120 |
| 2011/0276939 A1* | 11/2011 | Frankin et al. | 717/101 |
| 2012/0246616 A1* | 9/2012 | Frontiero et al. | 717/121 |

OTHER PUBLICATIONS

Title: "Immutable Objects", Author: Anonymous, location: http://www.javapractices.com/topic/TopicAction.do?Id=29 Date: Feb. 21, 2010.*
Author: Anonymous, Title: Immutable Objects, Located at http://www.javapractices.com/topic/TopicAction.do?Id=29, Feb. 21, 2010.*
Author: Lopez et al., Title: "Specifications and design of advanced authentication and authorization services", published by Elsevier in "Computer Standards & Interfaces 27 (2005) 467-478", available at www.sciencedirect.com 2005.*
Lopez et al., "Specification and design of advanced authentication and authorization services", available at www.elsevier.com/locate/csi, Computer Standards & Interfaces 27 (2005) 467-478, Available online Feb. 1, 2005.*

* cited by examiner

*Primary Examiner* — Don Wong
*Assistant Examiner* — Hossain Morshed
(74) *Attorney, Agent, or Firm* — Patents on Demand P.A.; Brian K. Buchheit; Scott M. Garret (57) ABSTRACT

A build process management system can acquire data pertaining to a software build process that is currently being executed by an automated software build system. The software build process can include executable process steps, metadata, and/or environmental parameter values. An executable process step can utilize a build artifact, representing an electronic document that supports the software build process. The acquired data can then be synthesized into an immutable baseline build process and associated baseline artifact library. The baseline artifact library can store copies of the build artifacts. The immutable baseline build process can include baseline objects that represent data values and dependencies indicated in the software build process. In response to a user-specified command, an operation can be performed upon the baseline build process and associated baseline artifact library.

19 Claims, 4 Drawing Sheets

BUILD PROCESS MANAGEMENT SYSTEM

BACKGROUND

The present invention relates to the field of automated software generation processes and, more particularly, to a build process management system.

In the field of software development and production, systems that automate the generation of the software product (i.e., executable file and support files) are a key tool for minimizing user errors and increasing the efficiency of the generation or build process. These automated software build systems often interface with other systems utilized in the software development/production process like configuration management systems and defect tracking systems to share data.

BRIEF SUMMARY

One aspect of the present invention can include a method for managing historical software build processes. Such a method can begin with a build process management system acquiring data pertaining to a software build process that is currently being executed by an automated software build system. The software build process can include executable process steps, metadata, and/or environmental parameter values. An executable process step can utilize a build artifact, representing an electronic document that supports the software build process. The acquired data can then be synthesized into an immutable baseline build process and associated baseline artifact library. The baseline artifact library can store copies of the build artifacts. The immutable baseline build process can include baseline objects that represent data values and dependencies indicated in the software build process. In response to a user-specified command, an operation can be performed upon the baseline build process and associated baseline artifact library. Such operations can include generating a listing of differences between at least two baseline build processes and baseline artifact libraries, reproducing a software application executable from a stored baseline build process and baseline artifact library, and generating a change history of baseline build processes for a single software application executable.

Another aspect of the present invention can include a system for managing historical software build processes. Such a system can include a software development environment and a build process management system. The software development environment can include a configuration management system and an automated software build system. The configuration management system can be configured to manage access to stored build artifacts. The automated software build system can be configured to execute a software build process to produce a software application executable from specified build artifacts. The build process management system can be configured to capture data regarding specific software build processes executed by the automated software build system, creating a set of historical records for the software build processes. A variety of operations can then be performed upon the set of historical records.

Yet another aspect of the present invention can include a computer program product that includes a computer readable storage medium having embedded computer usable program code. The computer usable program code configured to acquire data pertaining to a software build process that is currently being executed by an automated software build system. The software build process can include executable process steps, metadata, and environmental parameter values. An executable process step can utilize a build artifact, representing an electronic document that supports the software build process. The computer usable program code configured to synthesize the acquired data of the software build process into an immutable baseline build process and associated baseline artifact library. The baseline artifact library can store copies of the build artifacts. The immutable baseline build process can include baseline objects that represent data values and dependencies indicated in the software build process. In response to a user-specified command, the computer usable program code can be configured to perform one an operation upon a baseline build process and associated baseline artifact library. Such operations can include generating a listing of differences between at least two baseline build processes and baseline artifact libraries, reproducing a software application executable from a stored baseline build process and baseline artifact library, and generating a change history of baseline build processes for a single software application executable.

DETAILED DESCRIPTION

Currently, most automated software build systems are organized by process. A single build process produces the latest version or build of a specific software application. While useful for capturing the steps and/or parameters of the build process, this high-level focus lacks the ability to track the changes of the build process over time. Without capturing the specific process used to generate a specific build of the software application, automated software build systems are unable to reproduce a previous software build. Further, the changes made to the build process are typically not captured by the automated software build system, impeding even a manual reversion of the build process.

Some automated software build systems do include reports and/or an export capability for a build process or the resultant build. However, without historical documentation, the data from such reports or exports lack the context of the build process. Since the automated software build system lacks the functionality to synthesize this data into a useful or desired format, users often utilize external or third-party tools or develop such tools in-house.

To address these shortcomings, users must adopt inefficient and/or counter-productive measures. For example, users would need to keep hard-copy documentation of changes to build processes between builds in order to be able to revert a build process within the automated software build system. Users may attempt to hard-code the build of a software application into the name of the build process, creating a separate build process for each software application and build combination. Such an approach consumes additional storage space and the increase in build processes significantly reduces the performance of the automated software build systems. The above was discovered by the inventors in the course of developing the instant disclosure.

The disclosure details a solution for managing historical software build processes. A build process management system can capture data regarding specified software build processes executed by an automated software build system as well as the build artifacts used in the software build processes. The software build process data can be transformed into an immutable baseline build process. The build artifacts for the software build process can be stored as a baseline artifact library. The baseline build processes and baseline artifact libraries create a history of changes of the software build process over time. The build process management system can further include various operations that can be performed upon the captured baseline build processes and/or baseline artifact libraries, such as identifying differences between baseline build processes and reproducing a previous software build from an existing baseline build process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
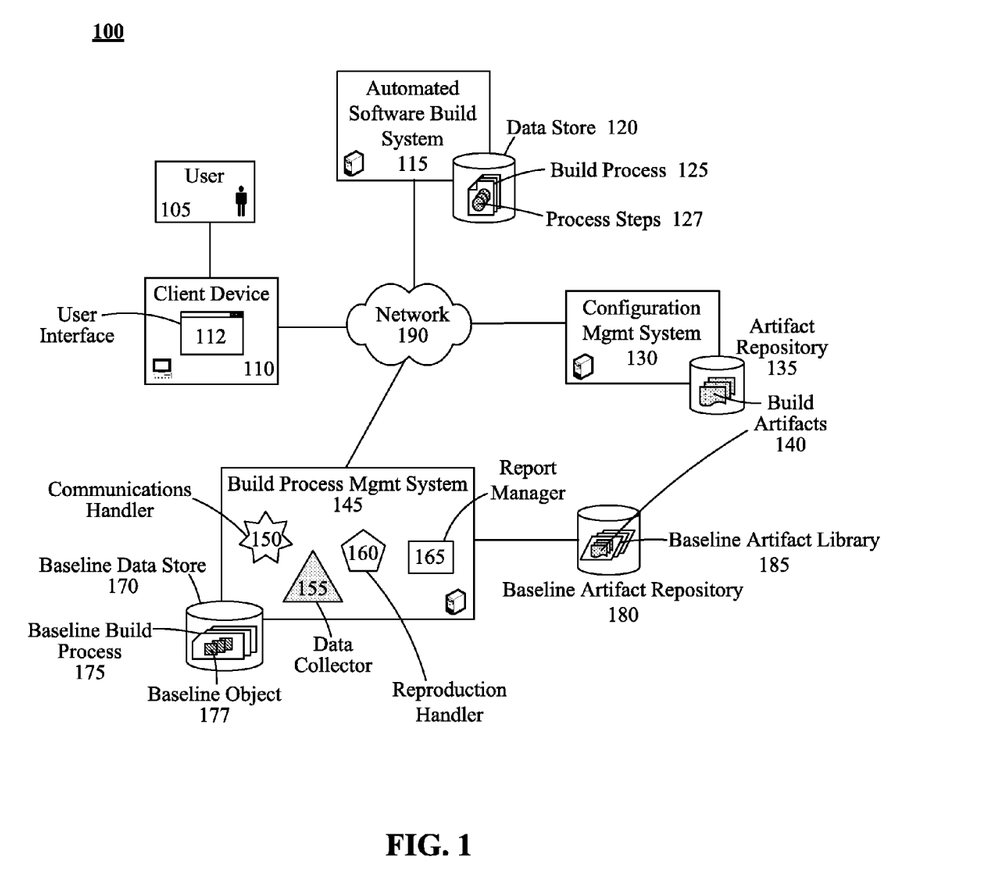
FIG. 1 is a schematic diagram illustrating a system that utilizes a build process management system to capture and track baseline build processes executed by an automated software build system in accordance with embodiments of the inventive arrangements disclosed herein.

FIG. 1 is a schematic diagram illustrating a system 100 that utilizes a build process management system 145 to capture and track baseline build processes 175 executed by an automated software build system 115 in accordance with embodiments of the inventive arrangements disclosed herein. In system 100, the build process management system 145 can generate a baseline build process 175 for a build process 125 being executed by the automated software build system 115.

The automated software build system 115 can represent the hardware and/or software components required to capture and execute a build process 125 to produce a software application deliverable (e.g., an executable file, a dynamic link library (.DLL) file, etc.). The build process 125 can be an electronic listing of process steps 127 the automated software build system 115 executes in a predetermined order.

Depending upon the specific automated software build system 115, a variety of data can be encapsulated within the build process 125. For example, in addition to executable instructions, environmental parameters (e.g., operating system version, server configuration, security permissions, etc.) can be captured and/or defined for process steps 127 or the build process 125 as a whole.

The build process 125 can instruct the automated software build system 115 as to which build artifacts 140 to utilize. The build artifacts 140 can represent various electronic documents utilized to synthesize a software application deliverable, such as source code files, help files, .DLL files, and the like. Build artifacts 140 can be stored in the artifact repository 135 of a configuration management system 130 and accessed over the network 190. Configuration management systems 130 are well known in the art, and, therefore, will not be discussed in detail herein.

It should be also noted that the automated software build system 115 can interact with additional computing systems, such as a defect tracking system, when executing a build process 125. Only those computing systems that directly interact with this embodiment of the present disclosure have been illustrated in system 100; however, such peripheral computing systems can be included within system 100 without departing from the spirit of this embodiment of the present disclosure.

Thus, execution of a build process 125 by the automated software build system 115 can only produce the specific build of a software application for which it is written. When a new build of the software application changes either the process steps 127 or values contained in the build process 125, the contents of the previous build process 125 can be lost. That is, the automated software build system 115 can lack the ability to historically track the evolution of the build process 125 for the software application through the various software builds.

The loss or lack of historical data regarding the build process 125 can also result in the inability to reproduce how a previous build of the software application was generated by the automated software build system 115. While the supporting build artifacts 140 of the previous software build should still exist in the configuration management system 130, usage of the current build process 125, which is written to generate the latest build, can result in the generation of a different software application build.

A build process management system 145 can be utilized to provide the functionality currently lacking in most conventional automated software build systems 115. The build process management system 145 can represent the hardware and/or software components required to provide a variety of historical and data analysis functions for build processes 125 performed by the automated software build system 115.

The build process management system 145 can include a communications handler 150, a data collector 155, a reproduction handler 160, a report manager 165, as well as a baseline data store 170 and baseline artifact repository 180. The communications handler 150 can be a component of the build process management system 145 that manages data exchanges between the build process management system 145 and the automated software build system 115 and/or configuration management system 130.

For example, the communications handler 150 can ensure that the electronic messages sent between systems over the network 190 utilize the format expected by the receiving system as well as any authentication or security information to ensure proper access.

The data collector 155 can represent the component of the build process management system 145 that collects data items from the automated software build system 115 and/or configuration management system 130. Through the use of a monitoring component (not shown) like an event listener, the data collector 155 can be activated when the automated software build system 115 executes a build process 125 that has been marked or designated for archival.

For example, the build process management system 145 can be configured to capture the build processes 125 for a software application that are of a specific version format (i.e., 2.0.0 or 2.5a). When the automated software build system 115 executes the build process 125 for that software application, the build process management system 145 can identify the build version and determine whether or not the build process 125 is to be captured.

The data collector 155 can synthesize the collected data into a baseline build process 175 and baseline artifact library 185. A baseline build process 175 can represent an immutable historical snapshot of the build process 125 of a software application for a specific build or version. Collected baseline build processes 175 can be stored in the baseline data store 170 having security permission configured such that modification of the baseline build processes 175 is not allowed.

A baseline build process 175 can include multiple baseline objects 177. A baseline object 177 can represent a data element regarding the composition and/or performance of the build process 125. Examples of baseline objects 177 can include, but are not limited to, the process steps 127 of the build process 125, metadata about the build process 125, environmental parameters used in the build process 125, references to build artifacts 140, dependencies between process steps 127, build artifacts 140, and/or baseline objects 177, and the like.

It should be noted that the baseline build process 175 and its baseline objects 177 do not include the actual build artifacts 140 used. That is, the baseline build process 175 can represent the execution data for the build process 125 (i.e., how the build process 125 is performed).

The build artifacts 140 that were used with the build process 125 can be copied by the data collector 155 from the artifact repository 135 of the configuration management system 130 into a baseline artifact library 185 stored in the baseline artifact repository 180. The baseline artifact library 185 can be associated with or referenced by its corresponding baseline build process 175. Like the baseline data store 170, the baseline artifact repository 180 can be configured to prohibit modification to the build artifacts 140 of a baseline artifact library 185.

This embodiment of the present disclosure utilizes two separate storage units, the baseline data store 170 and baseline artifact repository 180. In terms of required storage space, the build artifacts 140 of the baseline artifact library 185 can often be large data files; hence, the baseline artifact repository 180 would need to be of a sufficient size. The contents of the baseline build process 175 can consume considerably less storage space, allowing the use of a smaller baseline data store 170.

In another contemplated embodiment, the baseline build processes 175 and baseline artifact libraries 185 can be stored in a single data storage unit that is of a sufficient size.

While it may seem unnecessary to have copies of the build artifacts 140 stored external to the configuration management system 130, this practice can safeguard against data issues that occur to or within the configuration management system 130. Further, this approach can ensure that the same build artifacts 140 that were used when the automated software build system 115 executed the build process 125 are captured for future use without the possibility of modification by users 105.

To avoid storage space issues with the baseline artifact repository 180, it can be recommended that the creation of a baseline build process 175 and corresponding baseline artifact library 185 should be performed incrementally (i.e., every major build or when a critical defect is resolved).

Because copies of the build artifacts 140 used in conjunction with a captured baseline build process 175, a previous build of a software application for which a baseline build process 175 was captured can be recreated at a later date by the reproduction handler 160. The reproduction handler 160 can represent the component of the build process management system 145 that utilizes the collected baseline build process 175 and corresponding baseline artifact library 185 to reproduce the software application.

The report manager 165 can be the component of the build process management system 145 that analyzes the data contained in the baseline build processes 175 and/or baseline artifact libraries 185 to synthesize various information requested by the user 105. During the synthesis of data, the report manager 165 can be required to request additional information from the automated software build system 115 and/or configuration management system 130.

Examples of reports that can be produced by the report manager 165 can include, but are not limited to, the differences between specified baseline build processes 175, a dependency graph of the build artifacts 140 of a baseline build process 175, a listing of build artifacts 140 for a baseline build process 175, a historical evolution of the baseline build processes 175 for a software application, and the like.

The information generated by the report manager 165 can presented to the user 105 in the corresponding user interface 112 of the build process management system 145. The user interface 112 can represent a graphical interaction mechanism by which the user 105 can access the functions of the build process management system 145. For example, the user interface 112 can be a stand-alone graphical user interface (GUI) or utilize a Web browser as the delivery vehicle of a Web application.

The user interface 112 can operate upon a client device 110 capable of communicating with the build process management system 145 over the network 190. Client device 110 can represent a variety of computing devices, including, but not limited to a desktop computer, a laptop computer, a workstation, a network server, a smart phone, a personal data assistant, and the like.

Network 190 can include any hardware/software/and firmware necessary to convey data encoded within carrier waves. Data can be contained within analog or digital signals and conveyed though data or voice channels. Network 190 can include local components and data pathways necessary for communications to be exchanged among computing device components and between integrated device components and peripheral devices. Network 190 can also include network equipment, such as routers, data lines, hubs, and intermediary servers which together form a data network, such as the Internet. Network 190 can also include circuit-based communication components and mobile communication components, such as telephony switches, modems, cellular communication towers, and the like. Network 190 can include line based and/or wireless communication pathways.

As used herein, presented data stores 120 and 170 and repositories 135 and 180 can be a physical or virtual storage space configured to store digital information. Data stores 120 and 170 and/or repositories 135 and 180 can be physically implemented within any type of hardware including, but not limited to, a magnetic disk, an optical disk, a semiconductor memory, a digitally encoded plastic memory, a holographic memory, or any other recording medium. Data stores 120 and 170 and/or repositories 135 and 180 can be a stand-alone storage unit as well as a storage unit formed from a plurality of physical devices. Additionally, information can be stored within data stores 120 and 170 and/or repositories 135 and 180 in a variety of manners. For example, information can be stored within a database structure or can be stored within one or more files of a file storage system, where each file may or may not be indexed for information searching purposes. Further, data stores 120 and/or 170 and/or repositories 135 and/or 180 can utilize one or more encryption mechanisms to protect stored information from unauthorized access.

Figure 2:
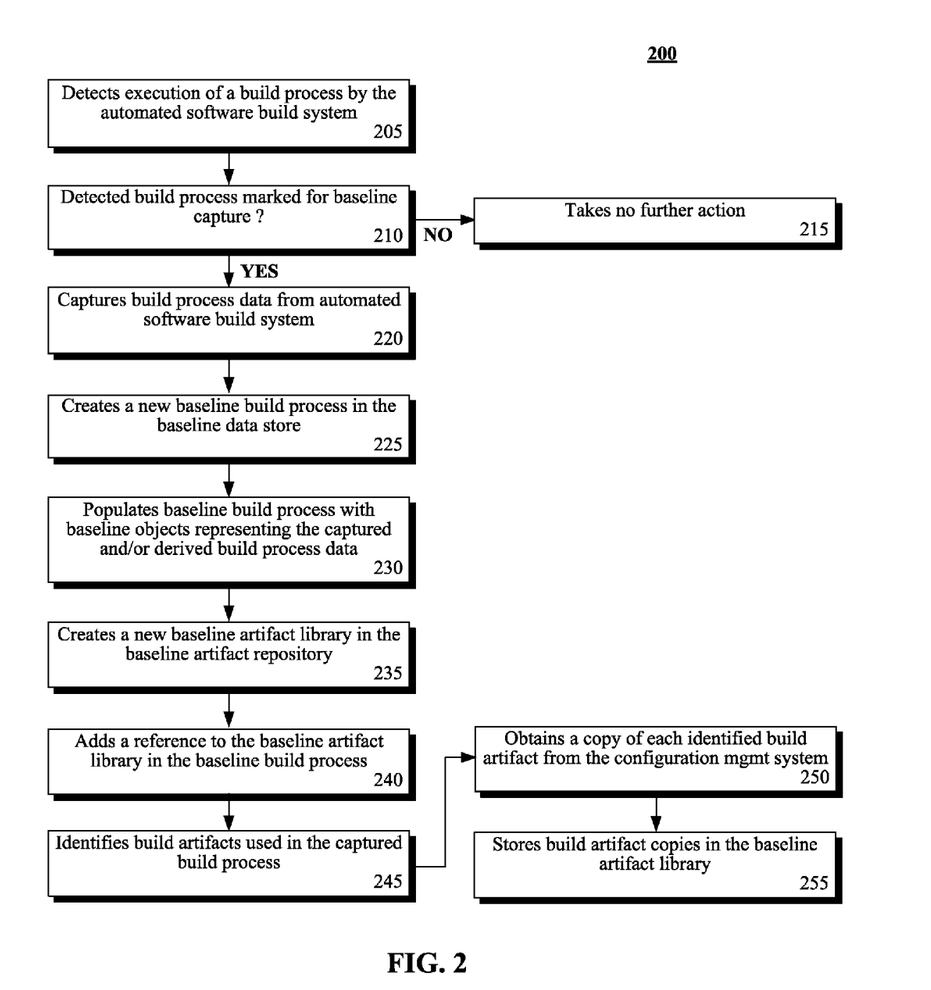
FIG. 2 is a flow chart of a method detailing the generation of a baseline build process by a build process management system in accordance with an embodiment of the inventive arrangements disclosed herein.

FIG. 2 is a flow chart of a method 200 detailing the generation of a baseline build process by a build process management system in accordance with embodiments of the inventive arrangements disclosed herein. Method 200 can be performed within the context of system 100.

Method 200 can begin in step 205 where the build process management system can detect the execution of a build process by the automated software build system. In step 210, it can be determined if the detected build process is marked for capture as a baseline build process.

When the detected build process is not marked for capture, the build process management system can take no further action with regards to the detected build process in step 215. When the detected build process is marked for capture, step 220 can execute where data about the detected build process can be captured from the automated software build system.

A new baseline build process can then be created in the baseline data store in step 225. In step 230, the created baseline build process can be populated with baseline objects that represent the captured data about the build process and/or data derived from the captured data.

A new baseline artifact library can be created in the baseline artifact repository in step 235. In step 240, a reference to the created baseline artifact library can be added to the baseline build process. The build artifacts used in the captured build process can be identified in step 245.

In step 250, a copy of each identified build artifact can be obtained from the configuration management system. The copies of the build artifacts can then be stored in the baseline artifact library in step 255.

Steps 205 and 210 can be performed by the primary logic of the build process management system, while steps 220-255 can be executed by the data collector component.

Figure 3:
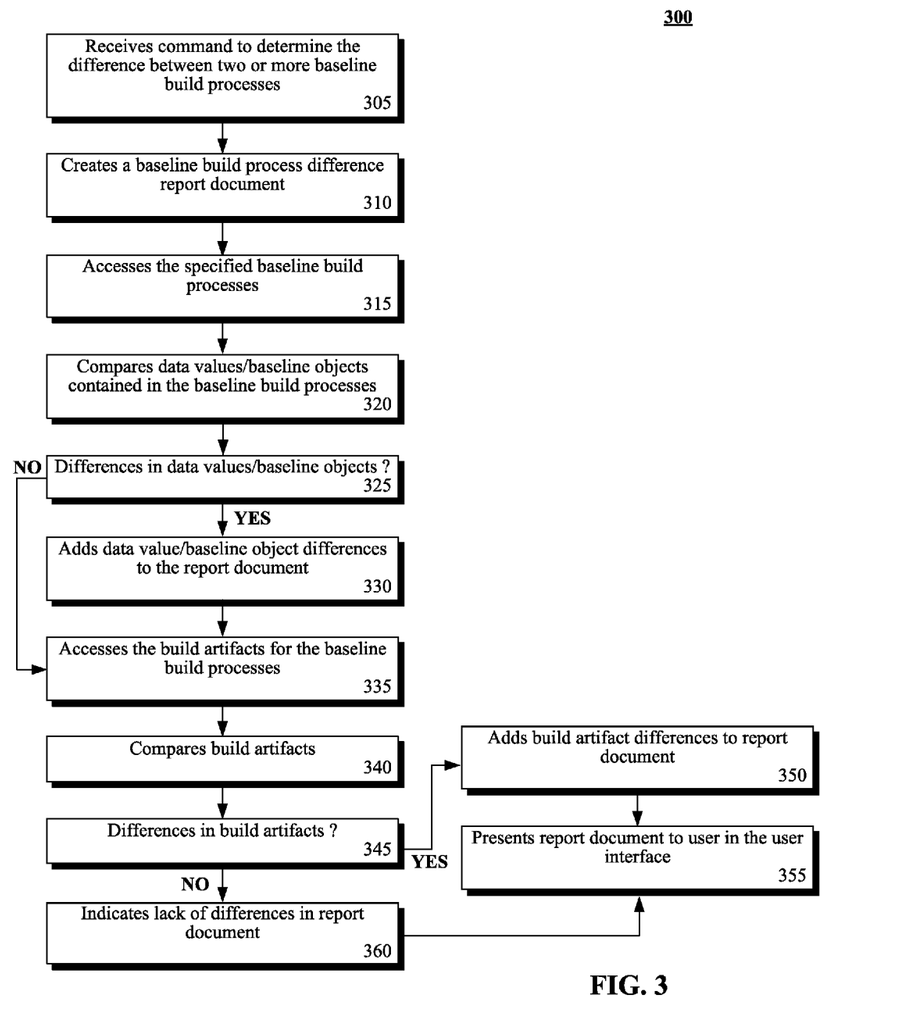
FIG. 3 is a flow chart of a method illustrating the generation of a report that identifies the differences between specified baseline build processes by a build process management system in accordance with an embodiment of the inventive arrangements disclosed herein.

FIG. 3 is a flow chart of a method 300 illustrating the generation of a report that identifies the differences between specified baseline build processes by a build process management system in accordance with embodiments of the inventive arrangements disclosed herein. Method 300 can be performed within the context of system 100 and/or in conjunction with method 200.

Method 300 can begin in step 305 where the build process management system can receive a command from a user to determine the difference between two or more baseline build processes. The document for this baseline build process difference report, herein referred to as the report document, can be created in step 310.

In step 315, the specified baseline build processes can be accessed. The data values and/or baseline objects contained in the baseline build processes can be compared in step 320. In step 325, differences in the data values and/or baseline objects can be identified.

When differences in the data values/baseline objects exist, step 330 can execute where the data value/baseline object differences are added to the report document. Upon completion of step 330 or when no differences in the data values/baseline objects exist, the build artifacts corresponding to the baseline build processes can be accessed in step 335.

In step 340, the build artifacts can be compared. Performance of step 340 can require the build process management system to request additional information from the configuration management system like change history data or metadata.

Differences in the build artifacts can be identified in step 345. When no differences in the build artifacts exist (i.e., same document version and identical contents), this lack of differences between the build artifacts can be indicated in the report document in step 360. From step 360, step 355 can execute where the report document is then presented to the user in the user interface.

When differences in the build artifacts exist, step 350 can execute where the build artifact differences can be added to the report document. The report document can then be presented to the user in the user interface in step 355.

It should be noted that the user can be provided with additional actions that can be taken upon the presented report document, such as saving or printing the report document.

Figure 4:
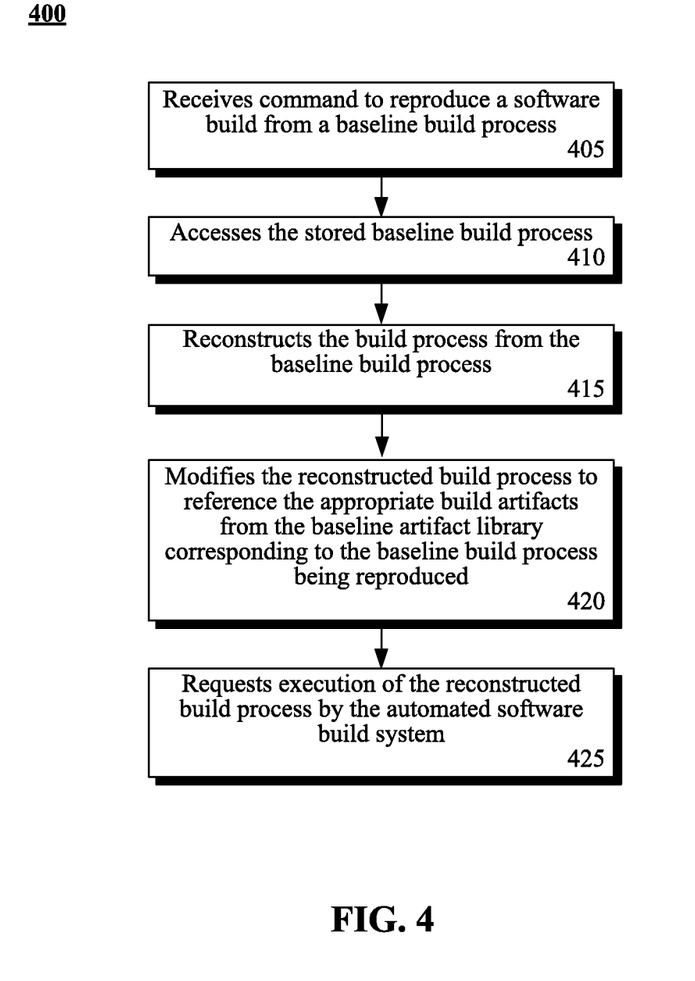
FIG. 4 is a flow chart of a method describing the reproduction of a previous build of a software application from a stored baseline build process by a build process management system in accordance with embodiments of the inventive arrangements disclosed herein.

FIG. 4 is a flow chart of a method 400 describing the reproduction of a previous build of a software application from a stored baseline build process by a build process management system in accordance with embodiments of the inventive arrangements disclosed herein. Method 400 can be performed within the context of system 100 and/or in conjunction with methods 200 and/or 300.

Method 400 can begin in step 405 where the build process management system can receive a command from the user to reproduce a software build from a baseline build process. The stored baseline build process can be accessed in step 410.

In step 415, the baseline build process can be used to reconstruct the build process that was executed by the automated software build system. It is important to emphasize that the build process management system derives the baseline build process from a captured build process, and that the automated software build system cannot execute a baseline build process.

Since the baseline build process contains the same data as the build process, only in a different format, the data of the baseline build process can be used in reverse to reconstruct the build process.

In step 420, the reconstructed build process can be modified to reference the appropriate build artifacts from the baseline artifact library that corresponds to the baseline build process being reproduced. Execution of the reconstructed build process can be requested of the automated software build system in step 425, thereby reproducing the software application build utilizing the identical build process and build artifacts as when the build process was first run and captured by the build process management system.

In another contemplated embodiment, the build artifacts can be coupled with the build process, so long as instructions are provided that indicate that the automated software build system is to use the enclosed build artifacts instead of corresponding or similar build artifacts contained in the configuration management system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
a software development environment, comprising hardware and software stored in at least one non-transitory storage medium said software executing on the hardware, at least comprising:
a configuration management system configured to manage access to stored build artifacts;
an automated software build system configured to execute a software build process to produce a software application executable from specified build artifacts; and
a build process management system to track changes of a build process over time, the build process management system configured to:
capture data regarding specific software build processes executed by the automated software build system, wherein a set of historical records for said software build processes is created, wherein a plurality of operations are capable of being executed upon said set of historical records; and
transform the captured data into a baseline build process, wherein the baseline build process represents an immutable historical snapshot of the build process of a software application for a specific build or version, wherein the baseline build process comprises execution data for the software build process, and the actual build artifacts used by the baseline build process are stored in a baseline artifact library;
a baseline data store for storing the baseline build process, wherein security permissions of the baseline data store prohibit subsequent modification of baseline build processes by the automated software build system, the configuration management system, or a user; and
a baseline artifact repository for storing the baseline artifact libraries, wherein security permissions of the baseline artifact repository prohibit subsequent modification of the baseline artifact library by the automated software build system, the configuration management system, or the user.

2. The system of claim 1, wherein the build process management system further comprises:
a communications handler configured to:
facilitate data exchanges between the build process management system and the automated software build system and the configuration management system;
ensure that the data exchanges utilize a format expected by a receiving system, wherein the receiving system is one of the build process management system, the automated software build system, and the configuration management system; and provide authentication and security mechanism for communication among the build process management system, the automated software build system and the configuration management system;

a data collector configured to capture software build process data from the automated software build system and copies of build artifacts from the configuration management system and store said build artifact copies as baseline artifact libraries;

a reproduction handler configured to reproduce the software build executable from an existing baseline build process and baseline artifact library; and a report manager configured to generate a variety of reports based upon performing at least one data analysis operations upon at least one of the baseline build processes and baseline artifact libraries, wherein the at least one data analysis operations comprises generating a listing of differences between at least two baseline build processes and baseline artifact libraries.

3. The system of claim 2, wherein the plurality of operations comprises at least generating a listing of differences between at least two baseline build processes and baseline artifact libraries, reproducing a software application executable from a stored baseline build process and baseline artifact library, and generating a change history of baseline build processes for a single software application executable.

4. The system of claim 2, wherein the communications handler is further configured to ensure proper access to the build process management system, the automated software build system and the configuration management system based upon authentication or security information.

5. The system of claim 1, wherein the build process management system further comprises:

a user interface configured to provide an interaction mechanism for accessing functionality provided by the build process management system.

6. The system of claim 1, wherein the build process management system is further configured to identify a build version and determine whether or not the build process for the identified build version is to be captured.

7. The system of claim 1, wherein a baseline build process comprises process steps of the software build process, metadata about the software build process, environmental parameters used in the software build process, references to the actual build artifacts, and dependencies between process steps of the software build process.

8. The system of claim 1, wherein the build process management system is further configured to create a baseline build process and a corresponding baseline artifact library incrementally.

9. The system of claim 1, wherein the build process management system is further configured to parse captured software build processes data into a plurality of baseline objects.

10. The system of claim 1, wherein the plurality of baseline objects comprise at least metadata about the build process.

11. The system of claim 10, wherein the environmental parameters comprise at least one of an operating system version, a server configuration, and security permissions.

12. A computer program product comprising a non-transitory computer readable storage medium having computer usable program code embodied therewith, the computer usable program code comprising:

computer usable program code configured to acquire data pertaining to a software build process that is currently being executed by an automated software build system, wherein said software build process comprises at least executable process steps, metadata, and environmental parameter values, wherein at least one executable process step utilizes a build artifact, wherein said build artifact represents an electronic document that supports the software build process;

computer usable program code configured to synthesize said acquired data of the software build process into an immutable baseline build process and associated baseline artifact library, wherein the baseline artifact library houses copies of build artifacts utilized in the software build process, and wherein said immutable baseline build process comprises execution data for the software build process and the actual build artifacts used by the baseline build process are stored in the baseline artifact library;

a baseline data store for storing the baseline build processes, wherein security permissions of the baseline data store prohibit subsequent modification of baseline build processes by the automated software build system, the configuration management system, or a user; and a baseline artifact repository for storing the baseline artifact libraries, wherein security permissions of the baseline artifact repository prohibit subsequent modification of the baseline artifact library by the automated software build system, the configuration management system, or a user.

13. The computer program product of claim 12, wherein acquiring the data pertaining to the software build process further comprises:

computer usable program code configured to detect the execution of the software build process by the automated software build system;

computer usable program code configured to determine if the software build process being executed by the automated software build system is to be captured, wherein said determination is based upon at least one user-defined criterion; and computer usable program code configured to, when the software build process is to be captured, obtain copies of the software build process and supporting build artifacts.

14. The computer program product of claim 12, wherein acquiring the data pertaining to the software build process further comprising:

computer usable program code configured to ascertain an identifier for build artifacts expressed in the at least one executable process step of the software build process;

computer usable program code configured to request access to the build artifacts corresponding to the ascertained identifiers from an associated storage system housing said build artifacts; and computer usable program code configured to copy each build artifact to the baseline artifact library associated with the baseline build process.

15. The computer program product of claim 12, wherein synthesizing the acquired data further comprises:

computer usable program code configured to create a new baseline build process for the software build process in a baseline data store, wherein said baseline data store is independent from the automated software build system, wherein security permissions of the baseline data store prohibit subsequent modification of baseline build processes by the automated software build system, the configuration management system, or a user;

computer usable program code configured to parse the acquired software build process data into the plurality of baseline objects; and computer usable program code configured to store said plurality of baseline objects in the created baseline build process.

16. The computer program product of claim 15, further comprising:

computer usable program code configured to create a new baseline artifact library for the created baseline build process in a baseline artifact repository, wherein said baseline artifact repository is independent from other storage systems utilized in the software build process, wherein security permissions of the baseline artifact repository prohibit subsequent modification of the baseline artifact library by the automated software build system, the configuration management system, or a user;

computer usable program code configured to store acquired build artifacts associated with the software build process in the created baseline artifact library; and computer usable program code configured to add a baseline object to the created baseline build process that references the new baseline artifact library.

17. The computer program product of claim 12, wherein, when the user-specified command is to generate the listing of differences between at least two baseline build processes and baseline artifact libraries, said method further comprising:

computer usable program code configured to create a new report document to contain the listing of differences;

computer usable program code configured to access the baseline build processes and associated baseline artifact libraries for the at least two baseline build processes designated in the user-specified command;

computer usable program code configured to compare the accessed baseline build processes and baseline artifact libraries;

computer usable program code configured to, when a result of said comparison identifies a difference between the at least two baseline build processes and associated baseline artifact libraries, add data regarding said difference to the report document; computer usable program code configured to, when the result of said comparison identifies the at least two baseline build processes and associated baseline artifact libraries as indifferent, add data indicating a lack of differences between the at least two baseline build processes and associated baseline artifact libraries to the report document; and computer usable program code configured to present said report document within a user interface.

18. The computer program product of claim 12, wherein, when the user-specified command is to reproduce the software application executable from the stored baseline build process and baseline artifact library, said method further comprising:

computer usable program code configured to access the baseline build process indicated by the user-specific command;

computer usable program code configured to reconstruct the software build process from the baseline build process, wherein said reconstructed software build process is formatted such as to be capable of being executed by the automated software build system;

computer usable program code configured to modify the reconstructed software build process to reference the build artifacts contained in the baseline artifact library associated with the baseline build process; and computer usable program code configured to request execution of the reconstructed software build process by the automated software build system, wherein execution of the reconstructed software build process reproduces the software application executable according to a previous version of the software build process than the software build process currently stored in the automated software build system.

19. A build process management system for providing historical data analysis functions for a build process performed by an automated software build system, the build process management system comprising:

one or more processors;

one or more memories storing program instructions executable by the one or more processors;

a data collector, comprising at least a subset of the program instructions, configured to: collect data items from the automated software build system;

synthesize the collected data items into a baseline build process and a baseline artifact library, wherein the baseline build process represents an immutable historical snapshot of the build process, wherein the baseline build process comprises execution data for the software build process and the actual build artifacts used by the baseline build process are stored in the baseline artifact library wherein the baseline artifact library is associated with or referenced by the baseline build process;

the baseline data store for storing the baseline build processes, wherein security permissions of the baseline data store prohibit subsequent modification of baseline build processes by the automated software build system, the configuration management system, or a user;

a baseline artifact repository for storing the baseline artifact libraries, wherein security permissions of the baseline artifact repository prohibit subsequent modification of the baseline artifact library by the automated software build system, the configuration management system, or a user; and a reproduction handler, comprising at least a portion of the program instructions, configured to reproduce a software application based on the baseline build process and the baseline artifact library; and a report manager, comprising at least a portion of the program instructions, configured to generate a dependency graph of build artifacts of the baseline build process, a listing of the build artifacts of a baseline build process, a historical evolution of the baseline build process, wherein the historical evolution of the baseline build process tracks changes of a build process over time.

* * * * *